(12) United States Patent
Everest (10) Patent No.: US 7,355,178 B2
(45) Date of Patent: Apr. 8, 2008

(54) INFRARED THERMOMETER WITH THROUGH-THE-LENS VISIBLE TARGETING SYSTEM

(76) Inventor: Charles E. Everest, 1891 N. Oracle Rd., Tucson, AZ (US) 85705

(*) Notice: Subject to any disclaimer, the term of this patent is extended or adjusted under 35 U.S.C. 154(b) by 163 days.

(21) Appl. No.: 11/158,683

(22) Filed: Jun. 22, 2005

(65) Prior Publication Data

US 2005/0279940 A1    Dec. 22, 2005

Related U.S. Application Data

(60) Provisional application No. 60/581,990, filed on Jun. 22, 2004.

(51) Int. Cl.
*G01J 5/00* (2006.01)
*G01J 5/02* (2006.01)
(52) U.S. Cl. .................. 250/338.1; 250/353
(58) Field of Classification Search ............ 250/338.1, 250/353
See application file for complete search history.

(56) References Cited

U.S. PATENT DOCUMENTS

| 4,494,881 A * | 1/1985 | Everest ................. 374/124 |
| 5,172,978 A * | 12/1992 | Nomura et al. ........... 374/130 |
| 2003/0099277 A1* | 5/2003 | Bellifemine ............ 374/121 |

* cited by examiner

*Primary Examiner*—David Porta
*Assistant Examiner*—Mindy Vu
(74) *Attorney, Agent, or Firm*—Quarles & Brady LLP (57) ABSTRACT

A conventional infrared thermometer is equipped with a visible light source having exactly the same size and shape as the infrared detector to illuminate the target so as to visibly identify the area to be thermally measured. The light source is judiciously positioned within the system so as to make the images of the detector and the source formed by achromatic zooming optics coincide on the target surface. As a result, the exact location and dimensions of the target area under test are precisely identified and the system can perform errorless measurements of targets located at variable distances from the thermometer. Alternatively, the system is enabled to errorlessly measure the same target with variable spatial resolution.

21 Claims, 6 Drawing Sheets

INFRARED THERMOMETER WITH THROUGH-THE-LENS VISIBLE TARGETING SYSTEM

RELATED APPLICATIONS

This application is based on U.S. Provisional Application Ser. No. 60/581,990, filed Jun. 22, 2004.

BACKGROUND OF THE INVENTION

1. Field of the Invention

This invention is related in general to the field of optical detectors. In particular, it relates to a variable-focus infrared optical detector system used for temperature measurements.

2. Description of the Related Art

Infrared (IR) detectors are utilized in various applications such as imaging, detection of spectral signatures of chemical species, and remote sensing. In addition, IR detectors are known to be used as IR thermometers (IRTs). The active surface of a typical IR-detector working as a thermometer consists of a series of thermocouple junctions which produce an output voltage in response to IR energy collected and delivered to the detector by the IRT's optical system. Since any target emits IR energy in proportion to its temperature, the output reading of IRTs is directly proportional to the target's temperature as well.

IRTs are known to be extremely susceptible to reading errors resulting from improper alignment with the target. An accurate temperature reading of the target can be made only if the area imaged upon the surface of the IR detector completely resides within the target boundaries. Since the background to any target under test emits a certain amount of IR radiation, when the IRT's optical system is not pointing directly at the target, the detector collects energy coming from not only the target but also from background, thereby providing an erroneous output reading. This shortcoming of conventional IRTs is augmented by the fact that IRTs operate in the portion of light spectrum not visible to the human eye (typically at wavelengths longer than 2 μm) and, therefore, the alignment of the IRT with the target cannot be visually controlled.

Figure 1:
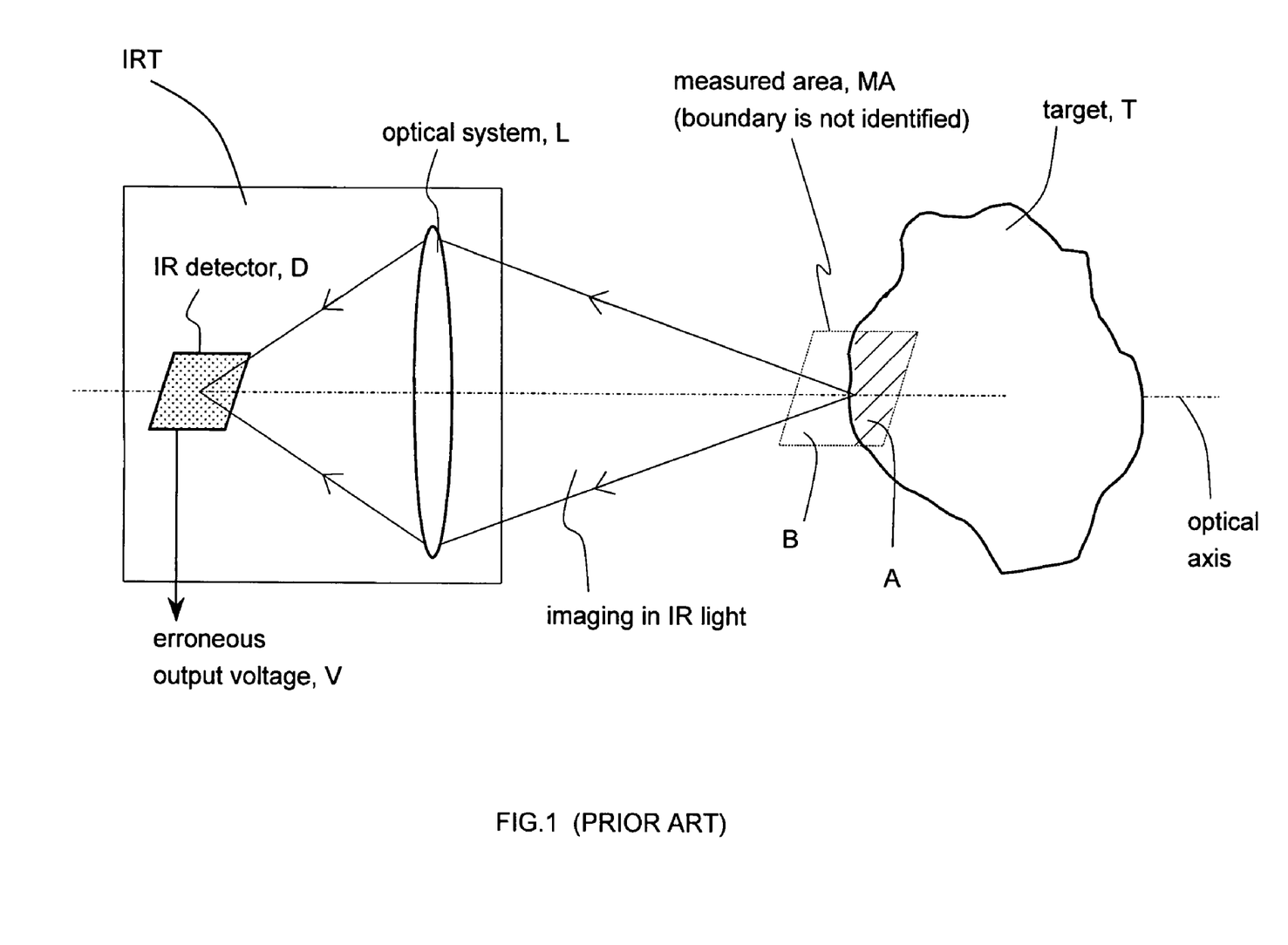
FIG. 1 is a schematic illustration of a conventional infrared thermometer without target identification and the erroneous measurement potentially produced thereby.

FIG. 1 illustrates schematically such a conventional condition. An optical system L collects IR energy emitted by a measured area MA that depends on the geometry and alignment of the system with a target T. The boundaries of MA are not visible to the operator and, therefore, are not easily identified. As a result, when the optical system L is misaligned with respect to target T, the IR energy incident on the detector D from within the area MA and giving rise to the output voltage V may be received not only from an area A on the target but also from a background area B outside the target (the areas A and B together comprising the measured area MA). Therefore, the output reading of the IR detector that is specifically calibrated to measure the temperature of the surface of the target T will contain an error. This problem persists regardless of the imaging conditions provided by the optical system L of the IRT. For example, if a zoom lens is used, a reading error will be present for any focal setting of the lens as long as the area MA imaged onto the detector D does not completely fall within the perimeter of the target T. As is well understood in the art, additional reading errors may also be introduced when the target area under test is tilted with respect to the optical axis of the IRT system.

Figure 2:
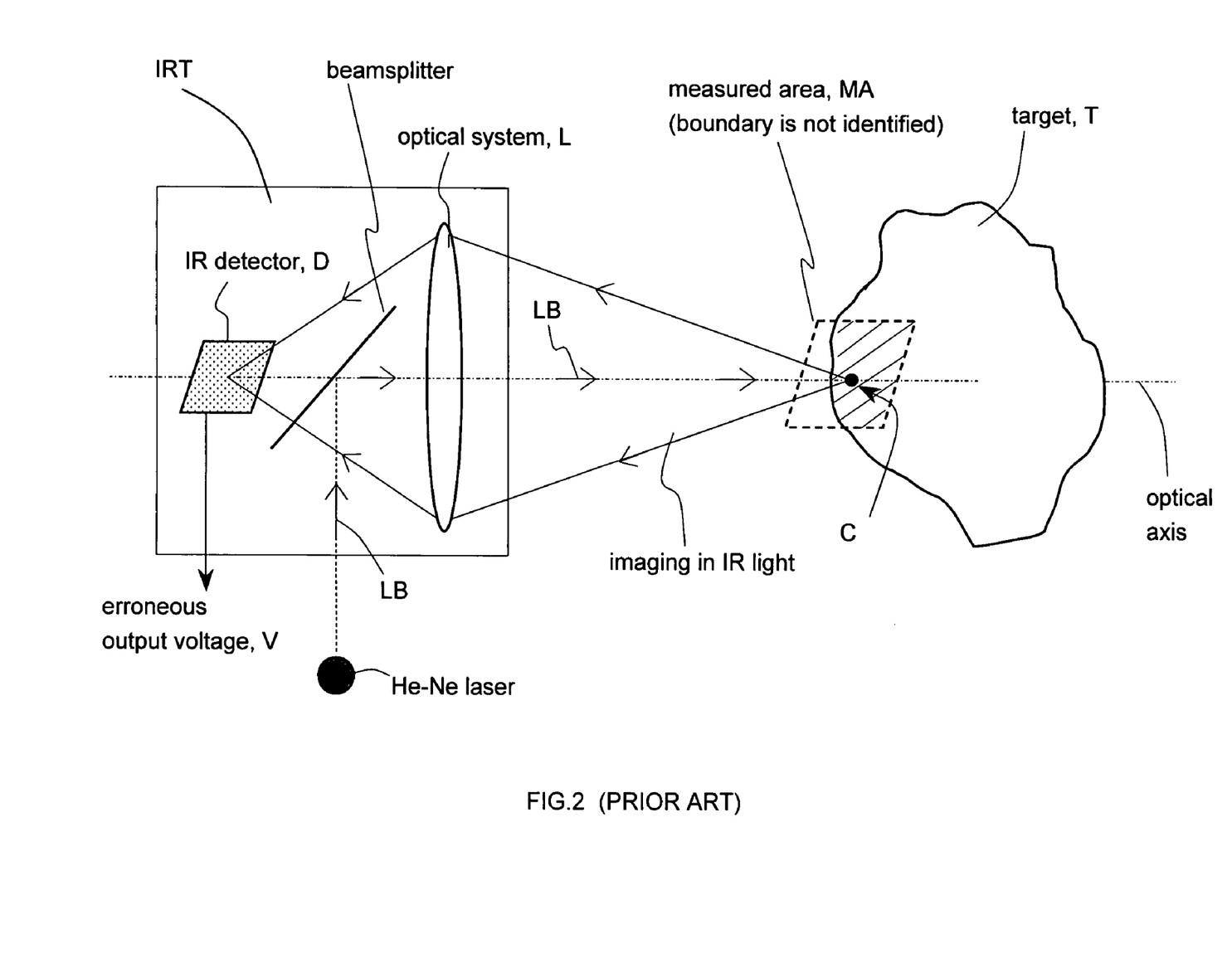
FIG. 2 is a schematic representation of a conventional infrared thermometer with a visible laser source for target identification.

An attempt has been made to solve the problem of determining the exact position of the target area under test by incorporating a source of visible laser radiation (such as helium-neon laser) into the IRT system, as shown in FIG. 2. In such configuration, the laser beam LB is typically aligned with the optical axis of the IRT system and delivered to the target through a lens L, thus visibly identifying the center C of the measured area MA. This solution does not solve the major problem, however. While spotting the position of the center of the measured area inside the perimeter of the target T, it does not show the boundaries of the measured area. Consequently, the IR detector will still collect background radiation when the measured area MA falls partly outside the perimeter of the target T due to misalignment of the optical system L with respect to the target.

Therefore, any IRT system that provides for unambiguous alignment of the IRT with respect to the measured target would represent a very desirable advance in the art, especially under variable imaging conditions. This invention achieves this goal by using a system of target sighting in the visible spectral region that is adapted to unambiguously identify not only the position but also the size of the target area imaged on the IR detector under variable focus conditions.

BRIEF SUMMARY OF THE INVENTION

The invention consists of combining a conventional IR thermometer with a visible light source (VLS) having exactly the same size and shape as the IR detector and used to illuminate the target surface so as to visibly identify the area to be measured. The VLS is judiciously positioned within the system so that its visible image, formed by the optics of the IRT system on the surface of the target, precisely corresponds to the area of the target the temperature of which is being measured. As a result, should the VLS image fall outside of the target surface, the IRT system can be appropriately aligned visually to provide for the exact temperature measurement of the target area.

According to one aspect of the invention, a visible light source (VLS) having a surface exactly the same in size and shape as the surface of a preferably lambertian IR detector is incorporated into a conventional IRT system and positioned so as to make the images of the IR detector and the VLS formed by the achromatic optics of the IRT system coincide on the surface of the target. This is preferably achieved by placing the VLS and the IR detector symmetrically with respect to a dichroic beamsplitter on the optical axis of the IRT. As a result, the surface area illuminated with the VLS on the target is the same area of the IR image of the detector formed on the target. Being coincident with the image of the detector, the image of the VLS on the target surface precisely and visibly defines the area of the target being imaged and measured by the detector. This allows for the accurate visible re-alignment of the IRT system should the measurements require it. It is understood that the symmetrical placement of the VLS and the IR detector with respect to the beamsplitter is not strictly required, so long as their images remain coincident.

According to another aspect of the invention, the exact location and dimensions of the target area under test are precisely identified, not only under static but also under variable imaging conditions (such as re-focusing of the IRT lens). This is achieved by forming an identifiable pattern on the surface of the VLS which comes into visible focus on the target when focusing of the IRT optics is optimal. For example, the VLS pattern can resemble the electron collector pattern of the IR detector. As a result of such precise focusing-identification feature, the system can perform errorless measurements of targets located at variable distances from the IRT or, alternatively, it can measure the same target with variable spatial resolution.

Since practical considerations often dictate miniaturization of test equipment, the preferred embodiment of the thermometer of the invention utilizes a single optical system to perform both optical functions of the system; that is, to identify the target area to be measured and to collect the IR radiation from that area onto the detector. This is achieved by operating the achromatic optics of the IRT in a two-directional dichroic imaging regime, wherein the VLS image is projected onto the target surface in visible light in one direction and the IR light emanating from the area of that image is delivered to the IR detector in the opposite direction by the same set of optics. Thus, the invention allows for cost-effective and mass-producible implementation of a variable-focus measurement-error-free IRT system with a through-the-lens target-identification feature.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

This invention arose from a long-time need in the field of infrared thermal measurements. Conventional IR thermometers have been unable to precisely and efficiently align the IRT on the target and to identify the target area being measured, so as to allow them not to collect any IR radiation emanating from the background surrounding the target and thus reduce measurement error. This invention provides the first IRT system capable of visible identification of the target area as required for accurate optical alignment between the IRT and the target for error-free measurement. This performance is achieved with a combination of variable-focus achromatic optics and a novel visible light source which is judiciously selected and positioned inside the IRT system so as to form an image that is optically coincident with the image of the IR-detector under any pre-defined imaging conditions. The visible image of the VLS formed on the target surface precisely defines the area of the target surface to be measured with the IRT in IR light. As long as the visible image of the VLS misses the target even partially, the IRT has to be properly aligned to deliver error-free measurement.

Figure 3:
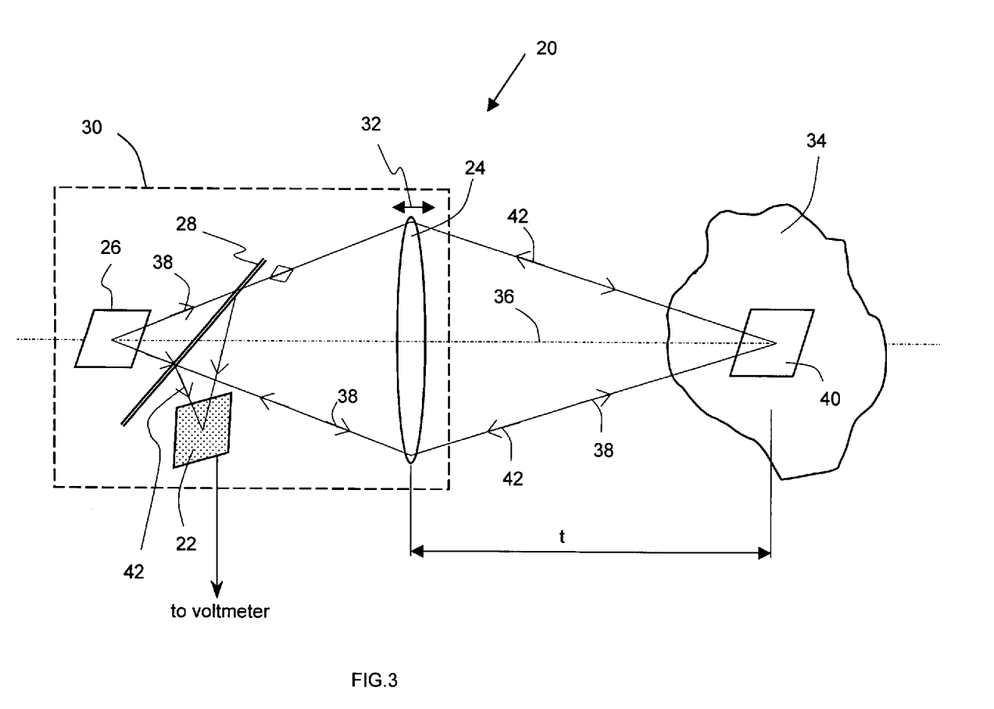
FIG. 3 illustrates an infrared thermometer system according to the invention.

In this invention disclosure the terms IRT assembly, IRT system, and IRT are used interchangeably. Similarly, focusing optics and zoom optics are used interchangeably to mean a system that permits refocusing. The term coincident, with reference to the images of the IR detector and the VLS formed on the surface of a target, means that the two images overlap and are also coextensive. Referring to the figures, wherein the same reference numerals and symbols are used throughout to refer to like parts, FIG. 3 is a schematic representation of a typical IRT assembly 20 according to the invention. In basic implementation, the IRT system 20 includes an IR detector 22, an achromatic lens 24, a visible light source 26, and a dichroic beamsplitter 28 integrated in a housing 30. The lens 24 is provided with some conventional means 32 for changing its focus (zooming) to image onto the detector 22 a target 34 located at variable distance t away from the IRT. The thermometer 20 is equipped with preferably a lambertian visible-light source 26 positioned precisely symmetrically to the detector 22 with respect to the dichroic beamsplitter 28, which is appropriately tilted to the optical axis 36 of the system. So located, the surfaces of the detector 22 and the VLS 26 are mirror images of each other in the plane of the beamsplitter 28 and are separated from the lens 24 by equal optical distances.

Figure 4:
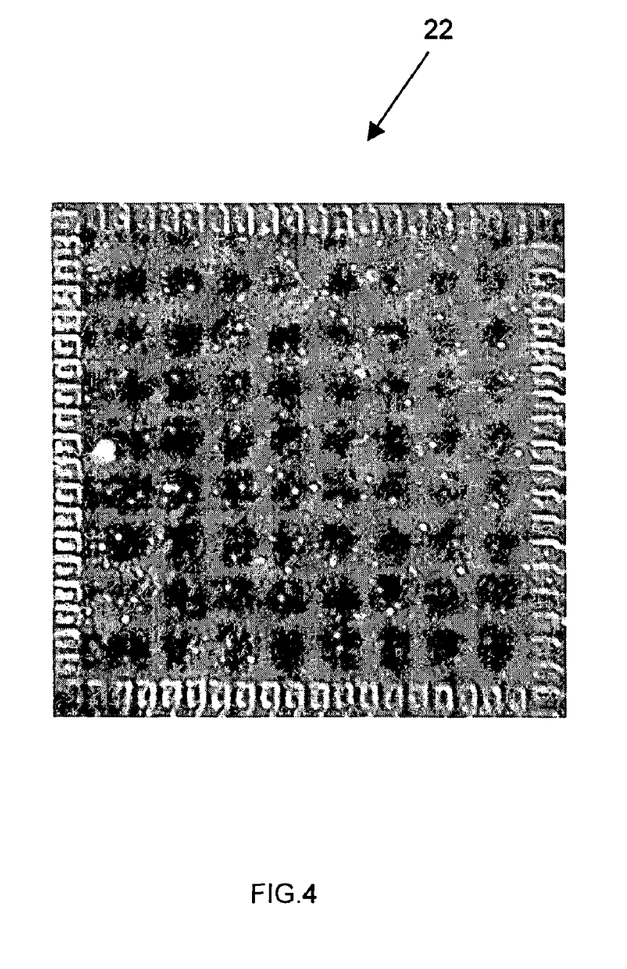
FIG. 4 shows plan view of the surface of a typical 750 μm by 750 μm square IR detector, as used in the invention.
Figure 5:
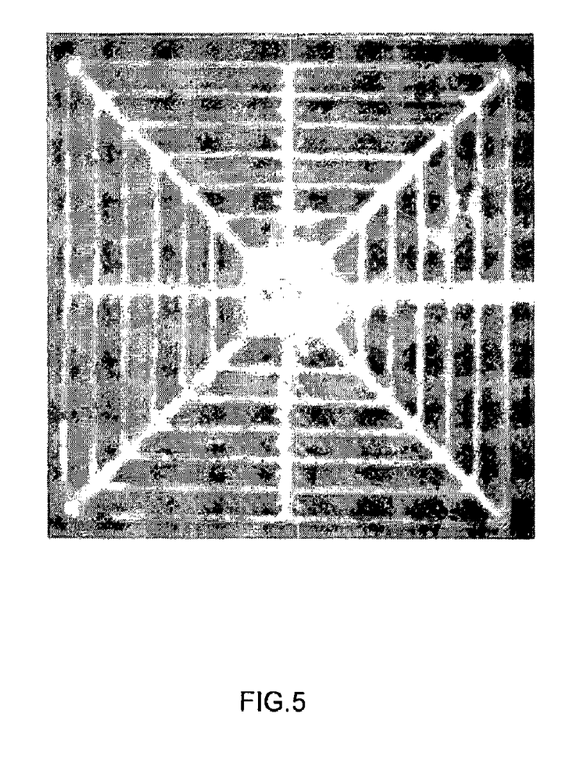
FIG. 5 provides an example of a pattern on the surface of the VLS that allows to monitor re-focusing of the infrared thermometer according to the invention.

The size and shape of the VLS 26 are chosen to be exactly the same as the size and shape of the detector 22, as shown in plan view in FIG. 4. The VLS 26 may be provided in various ways. For example, it may be an appropriately fabricated light-emitting diode (LED) or a back-lit diffuser by re-radiating visible quasi-monochromatic light. The dichroic beamsplitter 28 is positioned on the optical axis 36 at an angle (preferably 45 degrees) and operates by separating IR light from visible light. In reference to FIG. 3, the beamsplitter reflects IR radiation and transmits visible light in a calibrated fashion. As a result, during the measurement it delivers visible light 38 from the VLS 26 through the optics 24 to the surface of the target 34. When the optics 24 is appropriately focused on the target 34, the visibly lit target area 40 is optically conjugate to the area of the VLS and, therefore, is also optically conjugate to the area of the detector 22 due to symmetrical placement of the detector and the VLS. Accordingly, under optimal focusing of the lens 24, the area 40 is the visible image of the VLS 26 and is precisely coincident with the area of the target 34 that is projected backwards as IR light 42 through the lens 24 and onto the detector 22 for thermal measurements. Since the area 40 is visible, it is easy to ascertain whether a portion falls outside the target 34 (which would correspond to the situation of misalignment depicted in FIGS. 1 and 2) and to correct it by appropriately aligning the IRT system 20. To expedite focusing of the lens 24 on the target 34 and the following alignment correction, the surface of the VLS 26 may be additionally structured so as to provide an identifiable pattern that comes into focus when optimal imaging conditions are achieved. An example of such a pattern is shown in FIG. 5. The VLS surface patterning, visibly imaged onto the target surface, assures precise identification of not only the position but also the perimeter of the area 40 being thermally measured.

Practical considerations impose several additional requirements on the IRT system of the invention. For example, the beamsplitter 28 must have very low thermal mass to reduce calibration requirements and to allow its body temperature to change rapidly to quickly adapt to changing thermal ambient conditions (such as changes in incoming IR-radiation 42 or changes in temperature of the housing 30). For this reason the beamsplitter is preferably formed on a thin, rigid, plastic substrate.

Figure 6:
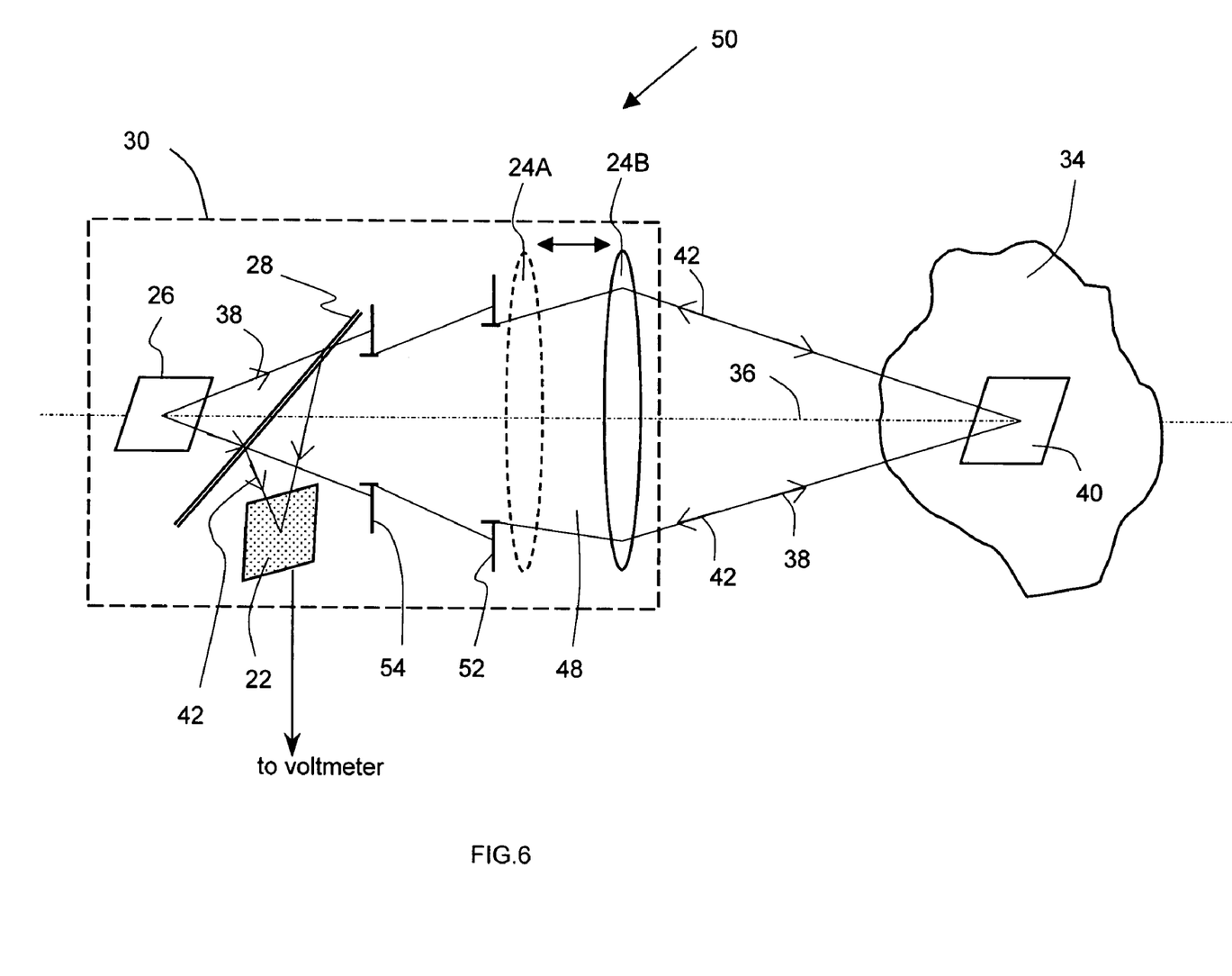
FIG. 6 is a schematic representation of an embodiment of the invention wherein the cone of IR light reaching the detector is limited to provide error-free measurements under variable zooming and variable thermal-ambient conditions.

As would be readily understood by one skilled in the art, the ability to re-focus the lens 24 in any IRT implementation is extremely advantageous. On one hand, fine adjustment of the focal length of the optics as described in reference to FIG. 3 is necessary for unambiguous target identification and errorless measurement. On the other hand, re-focusing the lens within a wide range of operation allows for measurements in a scanning regime conducted longitudinally along the optical axis of the IRT system. (This feature may be used advantageously if the target moves longitudinally with respect to the IRT.) Referring to FIG. 6, in practice it is preferred to assemble the IRT so that when the zoom lens 24 is in one of its extreme positions 24A the detector 22 is located in the focal plane of the lens. This corresponds to the situation when the lens 24 is focused at infinity. The other extreme position, 24B, is then defined by the available zooming range of the lens 24.

In the preferred embodiment 50 of the IRT of the invention, a set of additional conditioning elements is introduced into the optical train to provide for optimal operation of the system. One of the desirable features for a variable-focus IRT is that the output reading obtained from the target at constant temperature not change when the lens 24 is re-focused through its entire zooming range (from a proximal position 24A to a distal position 24B in FIG. 6). If this requirement is not satisfied, the IRT has to be calibrated after every re-focusing step for proper operation, which may render use of the IRT impractical for some applications. This requirement is met by appropriately introducing a fixed diameter baffle 52 in the optical train of the IRT 50 prior to the lens 24, as shown in FIG. 6. The purpose of the baffle 52 is to truncate the cone of light 48 collected by the detector 22 to a size which does not allow the lens 24 in its extreme distal position 24B (away from the detector) to be overfilled with visible light emanating from the VLS 26, nor the cone of light delivered to the detector to be smaller than a fixed aperture at any time within the range of focusing of the lens 24. Consequently, as is readily understood in the art, at any chosen focal length of the zoom-lens 24 (i.e., for any position of the lens between the extrema 24A and 24B) the aperture traversed by the IR energy collected by the lens from the visibly lit area 40 of the target 34 (i.e., from the image of the VLS formed by the lens 24 in its current location) and delivered to the detector 22 remains substantially the same. It is found that the most practical size for the baffle 52 is one with an aperture that limits the cross-section of the beam 48 to approximately half-a-diameter of the clear aperture of the lens in its extreme position 24B.

Also important is the need to reduce or even eliminate any IR-radiation background created by the housing 30 of the IRT 50, which would contribute to a reading error of the detector 22. To block this thermal background, an additional baffle 54 may be appropriately introduced into the optical train after the beamsplitter 28 and prior to the baffle 52. Once incorporated into the IRT system, the baffle 54 screens the detector 22 from the IR energy radiated by the portion of the IRT housing located to the right of the plane of the baffle 54 as shown in FIG. 6.

Figure 7:
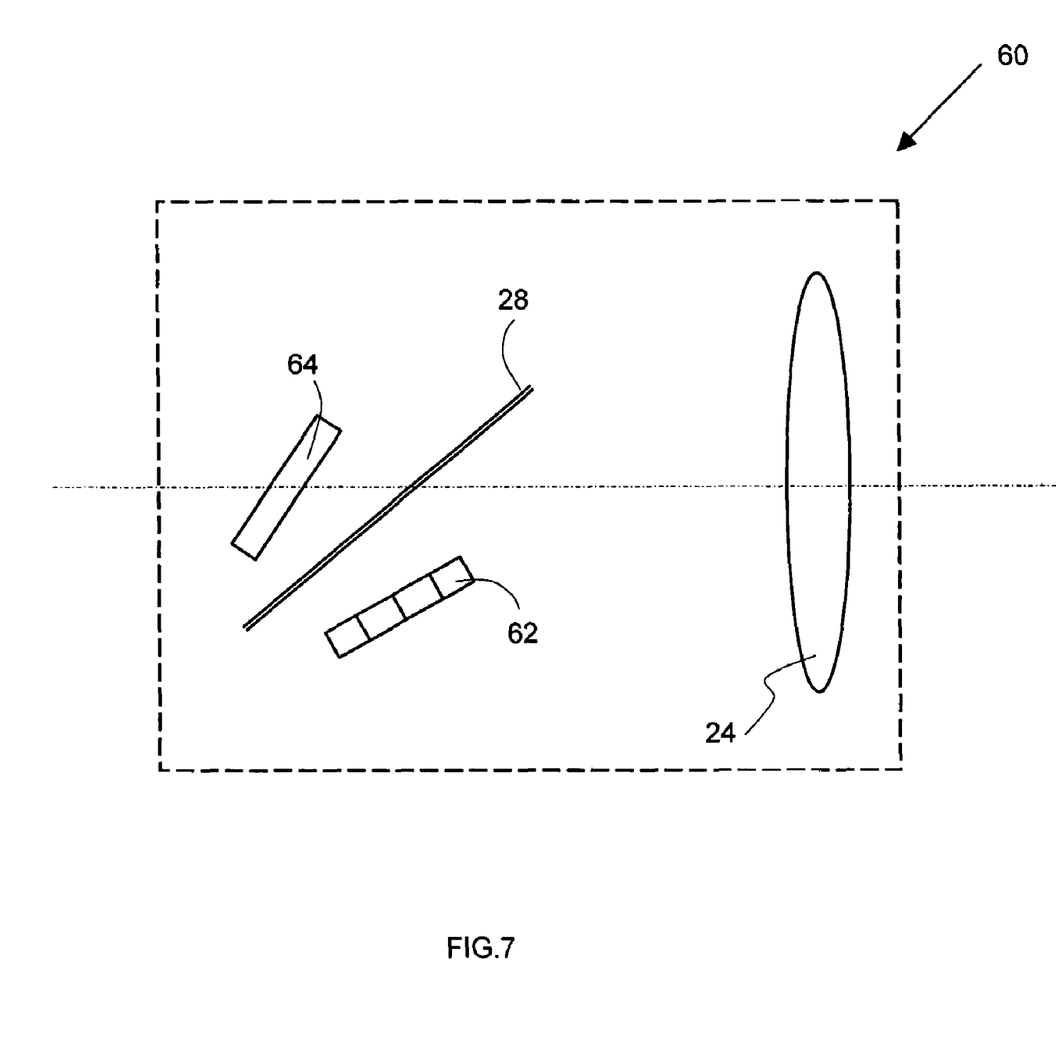
FIG. 7 illustrates an alternative embodiment of the invention with a one-dimensional array of detectors, capable of spatial profiling of the target during measurements.

Thus, a variable-focus infrared thermal detector has been described that provides a through-the-lens system of visible identification of the target under the test. The invention has been shown and described with respect to certain preferred embodiments and features, but it is understood that the scope of the invention is intended to encompass other embodiments which, although not described, may be or become available to those skilled in the art. For example, the positions of the detector 22 and the VLS 26 may be switched, in which case the dichroic beamsplitter 28 has to be reflective in the visible region and transmissive in the IR region of the spectrum (for example, T≧80% at wavelengths greater than 2 μm). Similarly, in alternative embodiments of the invention an array of detectors can be used to allow for simultaneous spatial profiling ("snap-shot") of the target. Such an embodiment 60 of the IRT is illustrated in FIG. 7, where the detector array 62 is shown as a linear detector, but it could be easily extended to a two-dimensional array. It is readily understood that, to provide for unambiguous target identification when using a detector array, the outermost dimensions, shape, and structure of the VLS have to mimic those of the detector array. Accordingly, in the example of FIG. 7 the VLS 64 may be a single light source of the extent equal to that of the detector array 62 or it may consist of an array of light sources with individual sizes corresponding to the individual sizes of the detectors in the array 62 and arranged in the same manner.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims to embrace any and all equivalent processes and products.

I claim:

1. A field-variable-focus infrared thermometer with a visible targeting device comprising:
    an infrared detector;
    a field-variable-focus optical system for producing a detector image on a target surface at various working distances, and for delivering infrared radiation from the target surface to the infrared detector; and
    a visible light source adapted to produce a light-source image having an identifiable pattern on the target surface, said light-source image being coincident with the detector image, wherein said identifiable pattern corresponds to an electron-collector pattern of the infrared detector.

2. The infrared thermometer of claim 1, wherein said light-source image is produced by the optical system, and the optical system is achromatic.

3. The infrared thermometer of claim 1, wherein said optical system includes a beamsplitter.

4. The infrared thermometer of claim 3, wherein said visible light source and said infrared detector are placed symmetrically with respect to the beamsplitter.

5. The infrared thermometer of claim 1, wherein said optical system further includes a baffle for limiting said infrared radiation received from the target surface, so as to ensure full irradiation of said baffle's aperture throughout a range of operation of the focusing optics.

6. The infrared thermometer of claim 1, wherein said optical system further includes a baffle for reducing background radiation received from sources other than the target surface.

7. The infrared thermometer of claim 1, wherein said optical system is achromatic, and includes a beamsplitter, focusing optics, a first baffle for limiting the infrared radiation received from the target surface so as to ensure full irradiation of said baffle's aperture throughout a range of operation of the focusing optics, and a second baffle for reducing background radiation received from sources other than the target surface; said visible light source and said infrared detector are placed symmetrically with respect to the beamsplitter; and said visible light source produces a visible identifiable pattern that corresponds to an electron-collector pattern of the infrared detector.

8. A method for precisely aligning an infrared thermometer with a target surface, comprising the following steps:
producing an identifiable, visible light-source image pattern coincident with a detector image pattern produced by the infrared thermometer; and
directing the visible light-source image to the target surface, wherein said identifiable, visible light source image pattern corresponds to an electron-collector pattern of the infrared detector.

9. The method of claim 8, wherein said visible light-source image pattern is produced through an achromatic optical system of the infrared thermometer.

10. The method of claim 9, wherein said visible light-source image pattern is produced by a visible light source, said optical system includes a beamsplitter, and the visible light source and an infrared detector of the thermometer are placed symmetrically with respect to the beamsplitter.

11. The method of claim 9, further including the steps of providing focusing optics in said optical system and of focusing said visible light-source image pattern on the target surface.

12. The method of claim 11, further including the step of providing a baffle in said optical system for limiting infrared radiation received from the target surface, so as to ensure full irradiation of said baffle's aperture throughout a range of operation of the focusing optics.

13. The method of claim 9, further including the step of providing a baffle in said optical system for reducing background radiation received from sources other than the target surface.

14. The method of claim 8, wherein said visible light-source image pattern is produced by a visible light source through an achromatic optical system of the infrared thermometer; said optical system includes a beamsplitter, and the visible light source and an infrared detector of the thermometer are placed symmetrically with respect to the beamsplitter; and
the method further includes the steps of providing a baffle in said optical system for limiting infrared radiation received from the target surface so as to ensure full irradiation of said baffle's aperture throughout a range of operation of the focusing optics; of providing a second baffle in the optical system for reducing background radiation received from sources other than the target surface; of providing focusing optics in the optical system; and of focusing said visible light-source image pattern on the target surface.

15. A method of manufacturing a field-variable-focus infrared thermometer with a visible targeting device comprising:
providing an infrared detector;
providing a field-variable-focus optical system for producing a detector image on a target surface at various working distances, and for delivering infrared radiation from the target surface to the infrared detector; and
providing a visible light source adapted to produce a light-source image having an identifiable pattern on the target surface, said light-source image being coincident with the detector image, wherein said identifiable pattern corresponds to an electron-collector pattern of the infrared detector.

16. The method of manufacture of claim 15, wherein said light-source image is produced by the optical system, and the optical system is achromatic.

17. The method of manufacture of claim 15, wherein said optical system includes a beamsplitter.

18. The method of manufacture of claim 17, wherein said visible light source and said infrared detector are placed symmetrically with respect to the beamsplitter.

19. The method of manufacture of claim 15, wherein said optical system further includes a baffle for limiting said infrared radiation received from the target surface, so as to ensure full irradiation of said baffle's aperture throughout a range of operation of the focusing optics.

20. The method of manufacture of claim 15, wherein said optical system further includes a baffle for reducing background radiation received from sources other than the target surface.

21. The method of manufacture of claim 15, wherein said optical system is achromatic, and includes a beainsplitter, focusing optics, a first baffle for limiting the infrared radiation received from the target surface so as to ensure full irradiation of said baffle's aperture throughout a range of operation of the focusing optics, and a second baffle for reducing background radiation received from sources other than the target surface; said visible light source and said infrared detector are placed symmetrically with respect to the beamsplitter; and said visible light source produces a visible identifiable pattern that corresponds to an electron-collector pattern of the infrared detector.

* * * * *